Nov. 6, 1928.     S. A. S. HAMMAR     1,690,931
GEAR TEETH
Filed Oct. 1, 1927
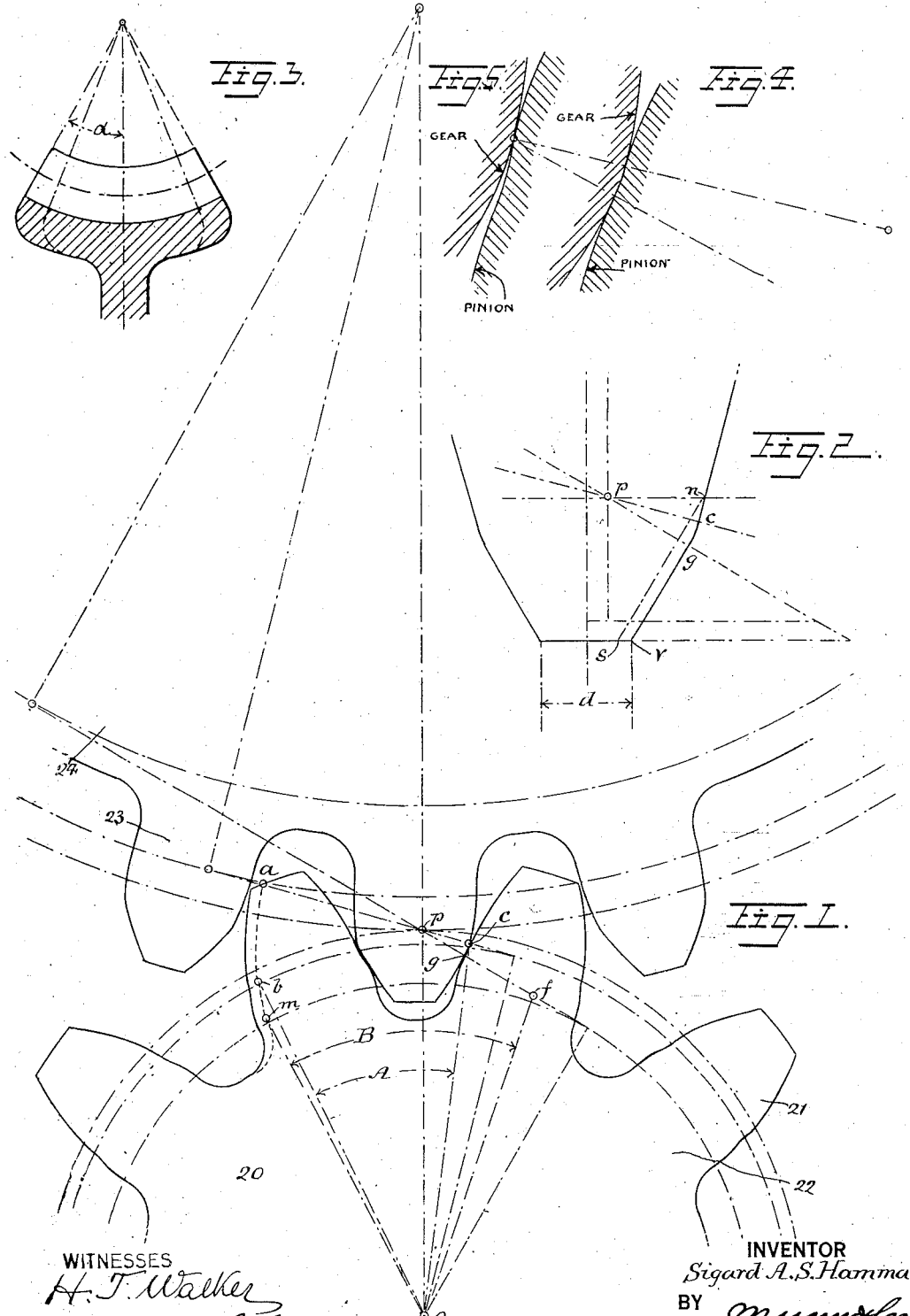
WITNESSES
INVENTOR
Sigard A. S. Hammar
BY
ATTORNEY Patented Nov. 6, 1928.

1,690,931

UNITED STATES PATENT OFFICE.

SIGARD A. S. HAMMAR, OF BETHLEHEM, PENNSYLVANIA, ASSIGNOR TO HAMMAR CO. INC., OF BROOKLYN, NEW YORK, A CORPORATION OF DELAWARE.

GEAR TEETH.

Application filed October 1, 1927. Serial No. 223,381.

The present invention is concerned with the provision of improvements in gear teeth; specifically, with the provision of gear teeth which represent an improvement over prior Patent No. 1,613,702, issued to me on the 11th day of January, 1927.

The prior patent disclosed a unique type of stepped gear teeth which have proven particularly applicable for use in connection with low speed heavy duty gears, but which are subject to certain inherent disadvantages when used in connection with external gears of low gear ratios.

The present invention aims to provide gear teeth especially applicable for the latter purpose. A further object is to provide pinions of low tooth numbers, which will have the same tooth pressure and the same duration of contact as ordinary pinions having a great many more teeth. The invention however, is also applicable to pinions of high tooth numbers.

My prior patent above mentioned, disclosed the use of stepped gear teeth with their profiles arranged in segments united by steps in such a manner that at least one of two mating gears had teeth which were thicker at the root than a tooth whose base was formed by the extension of the curve used at the pitch circle; while the base of the tooth of the second gear was formed by the curve used at the pitch circle when there was only one step, and by a curve giving greater root thickness when more than one step was used.

In order to obtain continuity of contact with such a tooth, it is essential that the involute curves forming two successive segments shall not be parallel; that is, that they should not have the same base circle. In the prior patent I have shown how a continuity and overlap of contact are obtained by joining any two successive segments by means of a step, which, when the two segments are in contact at the same time, lies inside of the angle formed by the pressure lines of the respective segments. Gear teeth so stepped are stronger and more rigid than unstepped teeth, and quite suitable for heavy duty at moderate speeds of rotation. They are especially adapted to internal drives, and to external drives when the gear is much larger than the pinion; but with external gears which do not differ much from the pinion in diameter, they give comparatively small clearance between the step of the gear and the step of the pinion, when these cross the common center line of the gear and pinion.

In accordance with the present invention, I provide gear teeth consisting of two or more segments joined in such a manner that the overlap of contact when the contact passes from one segment to the next, and the tooth clearance for that part of the tooth where the change from one segment to the other occurs, are amply sufficient for all gear ratios. These segments are connected by an intervening section or surface area of tooth contour which is not necessarily designed to impart rotation, and which for convenience of terminology in the following description will be called a "step".

Probably, the greatest advantage of the present invention is the great deflection of the tooth when loaded, which makes it stronger under suddenly applied excess loads, and therefore better adapted to high pitch line velocity than any other form of tooth.

It may be shown that pinions of low tooth numbers with this form of tooth may have as great a duration of contact or ratio between the angle of contact and the pitch angle, and as low a tooth pressure as pinions with more than double the number of teeth, whose tooth contours are formed by one continuous involute arc.

It is evident that for equal diameters, a pinion having a certain number of teeth will support a greater static load than a pinion having a greater number of teeth and smaller pitch; but it will also be shown that its resistance to shocks without breaking is increased in a still greater ratio.

A pair of involute gears in mesh have a common line of contact whose length equals the arc of contact of either gear. The two arcs of contact are equal and subtend angles which are inversely proportional to the pitch radii, and equal parts of the arc of contact also subtend angles which are inversely proportional to the pitch radii, therefore if;

R = pitch radius of the pinion
$R_1$ = pitch radius of the gear
A = angle of contact of the pinion
$A_1$ = angle of contact of the gear
$\alpha$ = addendum contact angle of the pinion
$\alpha_1$ = addendum contact angle of the gear
$\beta$ = dedendum contact angle of the pinion
$\beta_1$ = dedendum contact angle of the gear, then:

$$A = \alpha + \frac{\alpha_1 R_1}{R} \quad 1$$

$$A_1 = \frac{AR}{R_1} = \alpha_1 + \frac{\alpha R}{R_1} \quad 2$$

$$\beta = \frac{\alpha_1 R_1}{R} \quad 3$$

$$\beta_1 = \frac{\alpha r}{R_1} \quad 4$$

If the addendum is of such length that all of it makes contact on the line of action, its angle of contact is greater for a smaller pressure angle than for a larger one, but this condition limits the length of active addendum, and the addendum contact angle of gears running with pinions of low tooth numbers. The maximum obtainable dedendum contact angle for the pinion is—

$$\beta \max. = \frac{360°}{2\pi} \tan \theta \quad 5$$

where $\theta$ is the pressure angle.

From equation (5) we find that if $\theta = 14\frac{1}{2}°$ $\beta$ max. = 14.82° if $\theta = 30°$ $\beta$ max. = 33.08°.

I therefore use a small pressure angle for the addendum, and a large pressure angle for the dedendum or part of it. This gives an angle of contact which is much greater than the angle of contact of an unstepped tooth conforming to either pressure angle, and the contact may begin much farther from the base circle with a corresponding reduction in tooth pressure.

The pressure between two teeth in contact causes a distortion of the tooth contours which results in an area of contact extending in a narrow strip along the face of the tooth. The width of the strip $b$ is given by S. Timoshenko and R. V. Baud in the following formula:

$$b = 3.04 \sqrt{\frac{P}{E} \times \frac{r_1 r_2}{r_1 + r_2}} \quad 6$$

in which—

P = the load per inch length of face
E = modulus of elasticity of the material
$r_1$ $r_2$ = radii of tooth contours at the point of contact.

The same authorities give for the maximum tooth pressure at the middle of the area of contact—

$$p \max. = 1.5 \frac{P}{b}$$

If there is contact at the base circle of an involute gear or pinion, $r_1$ or $r_2$ equals zero, when $b$ becomes equal to zero and $p$ is infinite.

Excessive tooth pressure causes rapid deterioration in the form of pitting, wear, and finally rupture at the base of the pinion teeth. If we assume that the tooth pressure for a $14\frac{1}{2}°$ involute tooth is satisfactory when the contact begins at the middle of that part of the line of action which lies inside of the pitch circle, we get—

$$r_1 = r \frac{\text{sine } 14\frac{1}{2}°}{2} \text{ in which}$$

$r_1$ = radius of curvature of the pinion tooth,
$r$ = pitch radius of the pinion.

This is the value of $r_1$ at the beginning of contact when a 56 tooth pinion engages a gear having 180 teeth and has an addendum which equals three-tenths the circular pitch.

Referring now to the accompanying drawings for an illustrated embodiment of the invention—

Fig. 1 is a fragmentary side elevational view showing a ten tooth pinion embodying the present invention in mesh with a stepped gear also embodying the present invention.

Fig. 2 is an enlarged view of a rack tooth, which will mesh with the pinion of Fig. 1.

Fig. 3 is a sectional view of a worm gear showing in full lines the unstepped tooth of conventional design, and in dotted lines a tooth embodying the present invention and having an equal or greater area of contact.

Fig. 4 is an enlarged view showing the design of the step as used for the gear and pinion shown in Fig. 1.

Fig. 5 is an enlarged view of the same step, showing tooth clearance when the step passes the common center line of gear and pinion.

In Fig. 1 I have shown a ten tooth pinion 20 using the $14\frac{1}{2}°$ involute for the top segment 21 and the 30° involute for the bottom segment or root segment 22, making the radius of the involute where the contact of the top segment begins $$r_1 = r \frac{\text{sine } 14\frac{1}{2}°}{2},$$

and choose an addendum for the gear which will make the contact begin at a point on the root segment of the pinion where the tooth pressure is equal to or smaller than the pressure at the base of the $14\frac{1}{2}°$ segment. The maximum tooth pressure for the ten tooth pinion will equal the maximum tooth pressure for the 56 tooth unstepped pinion, the loads being equal.

In Fig. 1, the angle of contact of the ten tooth stepped pinion is the angle B, while the angle of an unstepped 14½° tooth giving the same maximum tooth pressure is the angle A. It will be seen that the angle B is much greater than the angle A, but the 56 tooth unstepped pinion will give an angle of contact which is much greater in relation to its pitch angle than the 10 tooth stepped pinion, and by shortening the tooth of the engaging gear, we can use a pinion of much fewer teeth having the same tooth pressure and the same duration of contact which is obtained with the stepped tooth of the 10 tooth pinion. The unstepped pinion would have 23 teeth.

It will be seen that for a given maximum tooth pressure and a given duration of contact, the tooth contour composed of the two involute arcs 21, 22 will give a tooth of much greater pitch, and therefore much greater strength than a tooth whose contour is formed by one continuous involute arc, assuming the diameters of the pinions to be equal.

In Fig. 1 the dotted line $a$—$b$—$m$ represents the position of a pinion tooth at the end of contact. The contact of the 14½° involute begins at the point $c$ and ends when the addendum circle of the tooth crosses the 14½° pressure line in the point $a$. The point $c$ has then advanced to $b$ and the angle $b$—$o$—$c$ = A is the angle of contact of the 14½° segment, and since the tooth pressure is governed by the radius of the involute, it is also the angle of contact of an unstepped tooth having the same maximum tooth pressure for the same load. The contact of the 30° segment begins at $f$, where the addendum circle of the gear crosses the 30° pressure line. The contact of the stepped tooth therefor begins at $f$ and continues along the 30° pressure into line $g$, when contact begins on the 14½° pressure line at $c$ and continues to $a$. At the end of contact the point $f$ has advanced to $m$ and the angle of contact of the stepped tooth is the angle $m$—$o$—$f$ = B.

For pinions running at high peripheral velocities, the difference in strength is still more in favor of pinions having teeth conforming to two pressure angles; particularly, when the step used is such that the root thickness is smaller than it would be if the two segments of the tooth contour intersected at a point on the pitch circle.

In Figs. 1 and 2, the line $p$—$g$ equals the line $p$—$c$=$r_3$. In Fig. 2 the line $n$—$s$ marks the addendum contour of a 30° unstepped rack of the same pitch. Due to the extension of the 14½° segment to the point $c$, the addendum contour of the stepped tooth follows the line $n$—$c$—$g$—$v$ with an increase in the thickness, which measured on a line parallel to the pitch line equals $2r_3$ (sec. 30°— sec. 14½°), causing an equal reduction in the root thickness of the pinion and making the strength of gear and pinion teeth about equal, although their root segments conform to different pressure angles. The rack tooth of Fig. 2 is shown with an addendum which equals three-tenths of the linear pitch. If a greater addendum is desired, as for instance, the addendum of a rack cutter used for generating teeth whose intervening spaces have sufficient depth to admit a tooth having an addendum of three-tenths times the pitch or more, and in addition adequate root clearance, the width of the flat $d$ becomes a limiting factor. For equal values of $d$, the addendum of the stepped tooth equals the addendum of the unstepped tooth plus $r_3$ cot. 30° (sec. 30°— sec. 14½°). By making the line $p$—$g$ longer than the line $p$—$c$, the length of the rack tooth may be still further increased.

When a pair of gears rotate together, there are slight irregularities in the pitch line velocity due to inaccuracies in the tooth contours and other causes. There are increments and decrements in velocity with corresponding increments and decrements in tooth loads. The load increments are impacts and proportional to the square of the velocity, and when the velocity is very great, may be several times as great as the normal loads. These increment loads cause a further deflection of the tooth beyond the normal, and this deflection is proportional to the load increment. If therefore, the teeth of two pinions are of equal strength, but the teeth of one pinion will deflect twice as much as those of the other under normal load, they will also deflect twice as much under the maximum load, and the difference in deflection will be twice as great, and the tooth will support an impact energy which is twice as great.

We have seen that a 10 tooth stepped pinion as shown in Fig. 1, and an unstepped 14½° pinion of 23 teeth will have the same tooth pressure for equal loads, and the same duration of contact, and assuming that the ratio between the length and the root thickness is the same for the teeth of both pinions, the deflection will be the same for equal loads; but the factor of safety of the 10 tooth pinion will be 2.3 as great. If then, the 23 tooth pinion has a deflection $f$ at normal load, and a factor of safety of 2, the deflection available for absorbing the energy of increment loads will be $f$. The deflection of the 10 tooth pinion under its maximum load will be $4.6f$ and the deflection available for absorbing the energy of impact loads will be $3.6f$.

The stepped tooth is particularly applicable to worm gears and helical gears, where the slip between the tooth surfaces is very great, and heating and wear are the principal causes of failure. The heating is proportional to the tooth pressure, and inversely proportional to the area of the above mentioned contact strip which is of variable width and extends diagonally across the face of the gear tooth. This strip may be very much widened at its narrow end by the use of stepped teeth. It follows that for equal areas of contact strip, the face of the stepped teeth will be shorter, and since the angle of contact of the stepped tooth contour is greater, the stepped tooth may have a shorter face and still have an overlap of contact which equals or exceeds the overlap of an unstepped tooth.

The pitch diameter of a worm gear is variable being smallest in the central plane, in which lies also the center line of the worm. The worm gear then, has an infinite number of pitch circles, and the further one of these lies from the central plane, the greater is its diameter, if—

R = the pitch radius of the gear in the central plane
$R_1$ = the pitch radius of the gear in any other plane
$r$ = the pitch radius of the worm
$\alpha$ = the angle formed by a radius of the worm drawn to the pitch point of the pitch circle whose radius is $R_1$
then
$R_1 - R = r$ versine $\alpha$.

As all points on the worm thread advance with the same velocity while the pitch line velocity of the worm gear increases with the increase in pitch radius, the increase in pitch radius is a great source of friction. The face of the tooth is proportional to the angle $\alpha$, while the versed sine is nearly proportional to the square of the angle. Therefore, any reduction in the face of the worm gear tooth results in a much greater reduction in the increase in pitch diameter at the end of the tooth.

It will be seen from the foregoing that the aim of the invention is to provide gear teeth which are both strong and flexible, and have sufficient tooth clearance, and that this is accomplished by the use of two involute curves and an intermediate section which does not impart rotation; the position of the involute forming the root segment of the pinion being such with reference to the center line of the tooth, that, if produced, it will intersect the involute forming the top segment inside the pitch circle. If the two curves do not intersect, the extension of the involute forming the base segment will intersect the base circle of the top segment at a point which is between the involute of the top segment, produced if necessary, and the center line of the tooth. This is made clear in the drawings.

The object of the invention is accomplished by the use of a tooth contour having a greater pressure angle for the root of the pinion tooth and the engaging top of the gear tooth, and a smaller pressure angle for the top of the pinion tooth and the root of the gear tooth. This, as shown, leaves a section of tooth contour, which need not make contact.

If this section makes contact it is not necessary for the contacts of the root and top segments to overlap. Such contact is obtained by the use of a pressure angle which is smaller than the pressure angle of the root segment of the pinion and greater than the pressure angle of the top segment, or the intermediate section may conform to a series of pressure angles. In the latter case the true tooth contour can be approximated very closely by the use of one circular arc.

While the invention provides pinions of low tooth numbers having the same tooth pressure and the same duration of contact as unstepped pinions having many more teeth, the invention is also applicable to pinions of high tooth numbers. For such pinions it is of advantage to reduce the pressure angles. One combination of pressure angles however, will advantageously cover a wide range in the number of teeth in the pinion, and high tooth numbers are less important with stepped pinions as provided by this invention than with pinions having the unstepped tooth.

Obviously various changes and alterations might be made in the general form and arrangements of the parts described without departing from the invention. Hence I do not wish to limit myself to the details set forth, but shall consider myself at liberty to make such changes and alterations as fairly fall within the spirit and scope of the appended claims.

It will be seen that the present invention is a modification of the invention disclosed in my earlier Patent No. 1,613,702.

In both the patent and the present case, the active tooth contour consists of two or more sections united by one or more steps. In both, a "step" is a break in the continuity, or change in the nature of the curve forming the contour of the tooth.

It is essential that the gears should rotate with a uniform velocity and the earlier invention consists primarily in preserving a uniform velocity of rotation while arranging the active tooth contour in section; each section being a separate mathematical curve. In the preferred structural embodiment of the patented invention, I have arranged the steps and sections so that there is a shoulder at each step, this construction giving the greatest root thickness.

In the present case, the shoulders at the steps are eliminated. The sections composing the active tooth contour are of such curvature that the requisite duration of contact is obtained with pinions having a smaller number of teeth, or a greater duration of contact is obtained with pinions having the same number of teeth. Here, the step is so located that this greater duration of contact is realized with two or more sections whose contact begins further from the base circle than is possible with an unstepped tooth.

I claim:

1. Gear teeth having contours consisting of two or more involute arcs conforming to different pressure angles, the involute arcs being connected by means of sections of tooth contour, which do not necessarily impart rotation, the position of the involute arcs being such that the root thickness is smaller than the root thickness of a tooth formed by one involute arc conforming to the greatest pressure angle.

2. Gear teeth, the contours consisting of two or more involute arcs in such positions, that two adjoining involutes may, if so desired, be connected by a circular arc which is a common tangent and has its center inside the angle formed by the pressure lines of the two involutes when these make contact at the same time.

3. A gear and pinion having active tooth contours consisting of two involute arcs of different pressure angles, the arc intersected by the pitch circle and also forming the addendum of the pinion having the smaller pressure angle, the arc forming the root segment of the pinion having the greater pressure angle and being in such position with reference to the center line of the tooth that the root thickness is smaller than that of a tooth conforming to the greater pressure angle.

4. A gear and pinion having teeth, whose contours consist of two involute arcs of different pressure angles, united by a section of tooth contour which does not necessarily impart rotation, the arc intersected by the pitch circle and forming the addendum of the pinion having the smaller pressure angle, this arc ending well above its base circle so as to avoid the tooth pressure, the arc forming the root of the pinion tooth having the greater pressure angle and serving to increase the length of active tooth contour.

5. A gear and pinion, each having tooth contours composed of two involute arcs united by a non-active section of tooth contour, the involute arc forming the root of the pinion tooth having the greater pressure angle and serving to increase the length of the tooth and of the active tooth contour, the position of the arcs being such that the thickness of the pinion tooth at the root is smaller than the root thickness of a pinion whose tooth contour consists of a single involute arc having the same pressure angle.

6. A gear and pinion, the active tooth contour of the gear composed of two involute segments, these segments joined by a section of tooth contour, may or may not impart rotation, the segment intersected by the pitch circle having the smaller pressure angle, the segment having the greater pressure angle forming part of the addendum of the gear and being in such position that it gives a thicker addendum than a tooth formed by one continuous involute of the same pressure angle, and permits the use of an addendum of greater length..

7. A gear and pinion, the tooth contours of the gear composed of two involute arcs of different pressure angles, in such position with reference to the center line of the tooth, that it permits the use of a longer addendum for the gear tooth and gives less root thickness for the teeth of both the gear and the pinion than a tooth contour formed by a continuous involute having the greater pressure angle.

Signed at Bethlehem, in the county of Northampton, and State of Pennsylvania, this 29th day of September, A. D. 1927.

SIGARD A. S. HAMMAR.